(12) United States Patent
Fischer et al.

(10) Patent No.: US 11,322,007 B2
(45) Date of Patent: May 3, 2022

(54) DANGER DETECTOR WITH A NON-CONTACT HEAT RADIATION SENSOR FOR DETECTING AN OPEN FIRE AS WELL AS TO DETERMINE AN AMBIENT TEMPERATURE

(71) Applicant: Siemens Schweiz AG, Zurich (CH)

(72) Inventors: Martin Fischer, Buelach (CH); Matthias Stutz, Zwillikon (CH)

(73) Assignee: SIEMENS SCHWEIZ AG, Zurich (CH)

( * ) Notice: Subject to any disclaimer, the term of this patent is extended or adjusted under 35 U.S.C. 154(b) by 1012 days.

(21) Appl. No.: 14/768,077

(22) PCT Filed: Feb. 10, 2014

(86) PCT No.: PCT/EP2014/052514
§ 371 (c)(1),
(2) Date: Aug. 14, 2015

(87) PCT Pub. No.: WO2014/135337
PCT Pub. Date: Sep. 12, 2014

(65) Prior Publication Data
US 2015/0379845 A1     Dec. 31, 2015

(30) Foreign Application Priority Data
Mar. 6, 2013    (EP) .................................... 13158067

(51) Int. Cl.
*G08B 17/12*      (2006.01)
*G01J 5/10*      (2006.01)
(Continued)

(52) U.S. Cl.
CPC ............ *G08B 17/12* (2013.01); *G01J 5/0014* (2013.01); *G01J 5/0018* (2013.01); *G01J 5/0066* (2013.01);
(Continued)

(58) Field of Classification Search
CPC ............ G08B 17/12; G01J 5/34; G01N 21/35
(Continued)

(56) References Cited

U.S. PATENT DOCUMENTS 4,619,533 A   *   10/1986   Lucas ....................... G01J 5/02
                                                                                         250/352
6,028,699 A   *   2/2000   Fisher ...................... E06B 5/18
                                                                                         359/360
(Continued)

FOREIGN PATENT DOCUMENTS

DE         19710946 A1      9/1998    ............... G01J 5/02
EP          0419046 A1      3/1991    ............... G01J 5/60
(Continued)

OTHER PUBLICATIONS

European Search Report, Application No. 13158067.2, 7 pages, dated Aug. 26, 2013.
(Continued)

*Primary Examiner* — David P Porta
*Assistant Examiner* — Carolyn Fin
(74) *Attorney, Agent, or Firm* — Slayden Grubert Beard PLLC

(57) ABSTRACT

A danger detector, for example a flame detector, includes an alarm housing with an alarm cover. The housing part of the alarm cover is permeable to heat radiation in the central infrared range. A non-contact, optical heat radiation sensor which is sensitive to the incoming heat radiation and optically oriented to the housing part is arranged in the alarm housing. A processing unit for further processing a sensor signal emitted by the heat radiation sensor is mounted downstream of the heat radiation sensor. The processing unit is designed to monitor the signal emitted by the sensor with respect to significant fluctuations or flicker frequencies for open flames and to determine, based on a direct component (Continued)

of the signal emitted by the sensor, a temperature value for the ambient temperature in the surroundings of the danger detector. The heat radiation sensor may be a thermopile or a bolometer.

17 Claims, 2 Drawing Sheets

(51) Int. Cl.
  *G08B 29/18* (2006.01)
  *G01J 5/00* (2022.01)
  *G08B 17/06* (2006.01)

(52) U.S. Cl.
  CPC ............... *G01J 5/10* (2013.01); *G08B 17/06* (2013.01); *G08B 29/183* (2013.01)

(58) Field of Classification Search
  USPC .......................................... 250/338.3, 339.15
  See application file for complete search history.

(56) References Cited

U.S. PATENT DOCUMENTS

| 6,203,194 | B1 | 3/2001 | Beerwerth et al. ........... 374/133 |
| 6,518,574 | B1* | 2/2003 | Castleman ............. G08B 17/12 |
| | | | 250/339.05 |
| 8,366,317 | B2 | 2/2013 | Ernst et al. .................... 374/131 |
| 2003/0222218 | A1 | 12/2003 | Nozu ......................... 250/338.1 |

FOREIGN PATENT DOCUMENTS

| EP | 2320397 A1 | 5/2011 | ............. G08B 17/10 |
| WO | 2005/121727 A1 | 12/2005 | ................ G01J 5/04 |
| WO | 2011/141703 A1 | 11/2011 | ............ A61K 31/713 |
| WO | 2011/141730 A1 | 11/2011 | ............. G08B 17/12 |
| WO | 2014/135337 A1 | 9/2014 | ................ G01J 5/00 |

OTHER PUBLICATIONS

International Search Report and Written Opinion, Application No. PCT/EP2014/052514, 14 pages, dated May 21, 2014.

\* cited by examiner

DANGER DETECTOR WITH A NON-CONTACT HEAT RADIATION SENSOR FOR DETECTING AN OPEN FIRE AS WELL AS TO DETERMINE AN AMBIENT TEMPERATURE

CROSS-REFERENCE TO RELATED APPLICATIONS

This application is a U.S. National Stage Application of International Application No. PCT/EP2014/052514 filed Feb. 10, 2014, which designates the United States of America, and claims priority to EP Application No. 13158067.2 filed Mar. 6, 2013, the contents of which are hereby incorporated by reference in their entirety.

TECHNICAL FIELD

The present invention relates to danger detectors, and more particularly, to a danger detector configured to both detect an open fire and determine an ambient temperature.

BACKGROUND

Flame detectors as danger detectors are known from the prior art which are intended to detect open fire with its characteristic modulated emissions and also to output an alarm in less than one second, typically in a fraction of one second. These types of flame detectors are tailored in respect of signal processing to the characteristic flicker frequencies of open fire, meaning flames and blazing embers, in the infrared range and if necessary in the visible and ultraviolet range.

With further known danger detectors configured for temperature detection the temperature sensor may be attached to the detector vertex in order to detect the ambient temperature of the danger detector as independently of direction as possible. The temperature sensor is typically an NTC resistor. The electrical connection to a corresponding evaluation unit which is located on a circuit carrier of the danger detector is made through a connecting line, which mostly leads through the optically sensitive inner space of the alarm housing and through the measurement chamber for smoke detection located therein. This leads to complex constructions in respect of the measuring chamber and makes the installation of the danger detector more difficult. In addition optical scattering at the pass-through of the connecting line is disadvantageously possible.

A serious problem in such detectors is also that the ambient temperature is only detected in point form by means of the NTC resistor. This requires a very precise mechanical positioning. Investigations in this area have shown that even deviations of less than 1 mm from the vertex point, meaning from the geometrically central position, can lead to significant directional dependencies. In addition it is disadvantageously necessary for the NTC resistor to be mechanically protected from the environment, e.g. by means of a separate dome or a cover.

SUMMARY

One embodiment provides a danger detector, e.g., a flame detector, comprising an alarm housing with an alarm cover, wherein a housing part of the alarm cover is transparent for heat radiation in the mid-infrared range, wherein a non-contact heat radiation sensor optically aligned to the housing part and sensitive for the incident heat radiation is disposed in the alarm housing, wherein the heat radiation sensor has a processing unit for further processing of a sensor signal output by the heat radiation sensor connected downstream from it and wherein the processing unit is configured to monitor the sensor signal for the occurrence of significant fluctuations or flicker frequencies for open fire as well as to establish from a steady component of the sensor signal a temperature value for an ambient temperature in the environment of the danger detector.

In a further embodiment, the alarm cover is composed of a housing part permeable to heat radiation in the mid-infrared range and an adjoining, remaining part embodied light-tight.

In a further embodiment, the housing part comprises a material which is permeable for light in the mid-infrared range, e.g., in a wavelength range from 3 μm to 20 μm.

In a further embodiment, heat radiation particles with a degree of emission for the heat radiation in the infrared range of at least 0.75, e.g., of a least 0.9, are introduced into the housing material of the housing part.

In a further embodiment, stray particles of such a volume proportion and in such a size distribution are introduced into the material of the housing part that these scatter the visible light and let the majority of the infrared light pass.

In a further embodiment, the housing part, for largely direction-independent acquisition of the ambient temperature, is located at a central position, e.g., in the middle of the housing.

In a further embodiment, the processing unit is configured for computationally establishing and deriving the temperature value from the steady component of the sensor signal and from a stored value for the degree of emission of the housing part.

In a further embodiment, the heat radiation sensor and the processing unit are combined in one component into a non-contact temperature/flame sensor.

In a further embodiment, the heat radiation sensor has a heat radiation-sensitive sensor surface and wherein an optical lens transparent for light in the mid-infrared range and/or an optical waveguide transparent for light in the mid-infrared range is disposed between the sensor surface and the housing part.

In a further embodiment, the heat radiation sensor comprises a thermopile or a bolometer.

In a further embodiment, the processing unit is configured to output a first message in the event of detected significant fluctuations or flicker frequencies and to output a second message if the established temperature value for the environment of the danger detector exceeds a predetermined temperature comparison value.

In a further embodiment, a gas sensor for fire flue gases and/or a measurement chamber with a stray light arrangement for detection of smoke particles is accommodated in the danger detector, and wherein at least one entry opening for the fire flue gases or smoke particles to be detected is disposed in the housing.

Another embodiment provides a method for detection of open fire and for establishing a temperature value in the environment of a danger detector, wherein a heat radiation entering a housing part transparent for heat radiation in the mid-infrared range, e.g., in a wavelength range from 3 μm to 20 μm, is detected in a non-contact manner by means of a heat radiation sensor sensitive for said radiation, e.g., using a thermopile or a bolometer, as a sensor signal, wherein on the one hand the sensor signal is monitored for fluctuations or flicker frequencies characteristic for open fire and on detection a first message is output, and wherein on the other hand a temperature value for an ambient temperature in the environment of the danger detector is established in pyrometric ways, and wherein the temperature value and/or a second message is output if the established temperature value exceeds a predetermined temperature comparison value.

In a further embodiment, the temperature value is established computationally, taking into account a degree of emission depending on the material and/or the surface property of the housing part, for its heat radiation in the mid-infrared range.

In a further embodiment, the temperature value is established on the basis of a ratio pyrometry.

BRIEF DESCRIPTION OF THE DRAWINGS

Example embodiments of the invention are explained below with reference to the drawings, in which.

DETAILED DESCRIPTION

Figure 1:
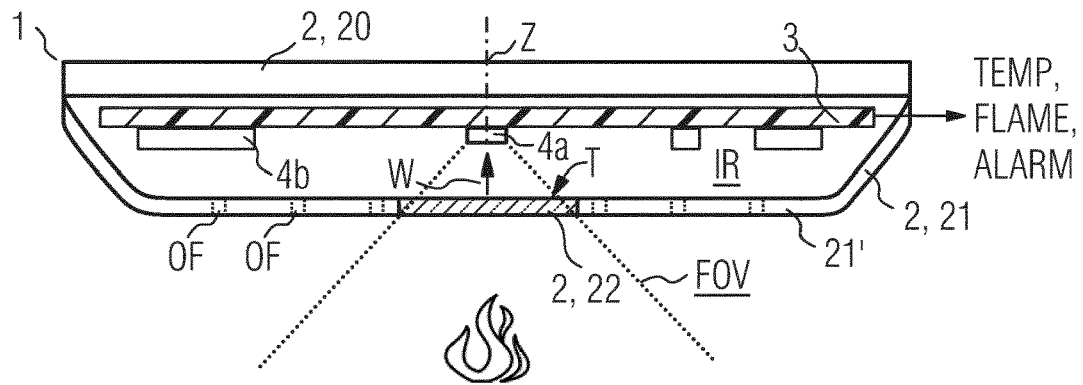
FIG. 1 shows an example of a danger detector embodied as a flame detector in accordance with certain embodiments.

Embodiments of the invention relate to a danger detector, in particular a flame detector, comprising an alarm housing with an alarm cover. The danger detector may be embodied as a point-type detector. A housing part of the alarm cover is permeable for heat radiation in the mid-infrared range. In addition a non-contact heat radiation sensor sensitive to the incident heat radiation and aligned optically to the housing part is disposed in the alarm housing. Connected downstream from the heat radiation sensor is a processing unit and computer-readable instructions stored in non-transitory computer-readable media and executable by the processing unit to further process a sensor signal output by the heat radiation sensor. The processing unit is configured, via execution of the computer-readable instructions, to monitor via the sensor signal for the occurrence of significant fluctuations or flicker frequencies for open fire.

The invention further relates to a method for detection of open fire and for establishing a temperature value in the environment of a danger detector.

"Infrared range" means the long wave range from 2 μm to 50 μm, which is also referred to as mid-infrared, abbreviated as MIR.

The heat radiation sensor may have a thermopile or a bolometer. The term thermopile is used more generally. Both the thermopile and also the bolometer typically each have a (single) sensor layer sensitive to heat radiation. They are especially non-imaging, i.e. they do not have a matrix including a plurality of heat radiation-sensitive "pixels", such as for example a matrix of 16 times 16 or 32 times 32 "pixels". In this sense the heat radiation sensor is considered only to have a single "pixel".

Embodiments of the present invention provide a danger detector which in a simple manner allows a detection of open fire and an acquisition of the ambient temperature. In some embodiments, the danger detector includes a processing unit and computer instructions executable to analyze a sensor signal to both detect an open fire and establish (from a steady component of the sensor signal) a temperature value for an ambient temperature in the environment of the danger detector.

Other embodiments provide a corresponding method for detection of open fire and for acquisition of the ambient temperature.

A key aspect lies in the knowledge that on the one hand rapid changes of the sensor signal can be used for the detection of open fire and on the other hand the steady component of the sensor signal, i.e. the DC component, can be used for establishing the temperature in pyrometric ways using measurement technology.

The steady component in this case corresponds to an essentially constant and only slowly changing value for the heat radiation which is emitted by the housing part of the alarm cover located in the optical detection area permeable for heat radiation. This heat radiation is in a direct relationship with the temperature of the housing part, wherein the temperature of the housing part, i.e. to put it more precisely the temperature lying on the inner side of the housing part follows the actual ambient temperature with a slight, acceptable delay. In such cases the alarm cover and thus the housing part usually heat up most quickly with the detector installed on a ceiling according to specification.

The housing part may be rotation-symmetrical. It may have the shape of a circular disk or in respect of geometry is part of a sphere surface.

This enables to characteristic fire variables to be detected by means of only one heat radiation sensor. A separate further component for detecting the temperature in the environment of the danger detector can be dispensed with.

Through the non-contact acquisition of the heat radiation emitted by the housing part, electrical wiring, which is expensive and susceptible to EMC through to a processing unit for the detection and evaluation of the temperature may also be omitted. In addition the "temperature sensor" may be located protected inside the housing.

It may be advantageous for the heat radiation sensor to be disposed as an SMD component on this circuit carrier. By comparison with a manual installation of the NTC resistor required for this purpose said installation is dispensed with. In addition an automated SMD installation is far better and more exact.

In addition, due to the inventive non-contact ambient temperature detection a larger surface is able to be detected compared to a more point-type temperature detection for an NTC resistor. By comparison with conventional installation with an NTC resistor installation and component tolerances are advantageously now far less critical.

According to one embodiment the alarm cover is composed of a housing part permeable for heat radiation in the mid-infrared range and an adjoining remaining part embodied light-tight. "Light-tight" means that the remaining part of the housing cover is neither permeable for visible light nor for infrared light. "Visible light" means the light wavelength range optically perceptible for human beings of around 380 nm to 780 nm. The material of the remaining part of the alarm cover may be a white plastic, such as polyethylene for example, into which UV-stabilized $TiO_2$ or ZnO particles are introduced. Such a plastic has long been used in conventional fire and smoke detectors.

According to one embodiment the housing part comprises a material which is permeable for light in the mid-infrared range, e.g., in a wavelength range from 3 µm to 20 µm. Such a material can for example be a plastic such as a thermoplastic based on polymethylmethacrylate or polycarbonate, a glass, such as quartz glass or germanium glass for example, or a ceramic, such as transparent fine-crystalline spinel ceramics based on magnesium and aluminum oxide.

According to a further embodiment stray particles are introduced into the material of the housing part in such a volume proportion and such a size distribution that they scatter the visible light and let the majority of the infrared light pass.

As an alternative or in addition at least one part of the surface of the housing part can have a structuring such that this scatters the visible light and lets the majority of the infrared light pass. The structuring may have structure widths in the range of the wavelength of infrared light, meaning structure widths in the range of 3 µm to 20 µm. The structures can be points or lines for example. Such a structuring can be achieved by etching, very fine brushing or electron polishing of the housing part surface.

In particular the material in the three previously stated forms of embodiment appears in the optically visible range as impermeable, e.g., as opaque or white-opaque. The danger detector thus has a housing or a housing cover as part of the housing which is known in its type of construction per se to someone looking at other fire detectors. Otherwise a housing part appearing dark and glassy in the alarm cover could arouse suspicion in an observer that the device involved could be a surveillance camera. This may be avoided by the overall appearance of the danger detector impermeable in the optically visible, e.g., white range.

According to a further embodiment heat-emitting particles with a degree of emission for heat emission in the infrared range of at least 0.75, e.g., of at least 0.9, are introduced into the material of the housing part. The heat emission particles can be soot particles for example. Through the higher heat emission caused thereby a better measurement evaluation with a higher accuracy is possible at the same temperature.

According to a further embodiment, for largely direction-independent acquisition of the ambient temperature, the housing part is located at a central position, e.g., in the middle of the housing. Since the housing part in the middle of the housing heats up similarly quickly from each direction, the central arrangement enables a far lower direction dependency to be achieved in thermal response behavior.

According to a further embodiment the processing unit, via execution of computer-readable instructions, is configured for computationally establishing and deriving the temperature value from the steady component of the sensor signal and from a stored value for the degree of emission of the housing part. The computational establishment of the temperature value is generally known in accordance with the pyrometric measuring principle. The computing effort required for this can also be carried out by a processing unit provided for control and evaluation of the danger detector. The degree of emission of the housing part of the alarm cover is dependent in such cases on the surface property and/or its material. The degree of emission required for this can be established for example by measurement technology within the framework of sample checking. The established value can then be stored electronically in the processing unit or can be loaded from a non-volatile semiconductor memory connected thereto. The processing unit may be a microcontroller. Such a microcontroller then has the necessary computing steps for computational establishment and derivation of the temperature value from a current value of the sensor signal from the stored emission value. The microcontroller can also be an A/D converter for converting the sensor signal output by the heat emission sensor into a corresponding digital value. The microcontroller may be configured to take over a large part or all of the control and evaluation tasks of the danger detector, through to alarm output.

As an alternative thereto the danger detector can also comprise two non-contact heat radiation sensors sensitive for heat radiation in the infrared range with different spectral heat radiation sensitivity from one another as well as the processing unit. The processing unit in this case is configured for establishing the temperature value on the basis of a ratio pyrometry. The temperature value is then able to be established uniquely from the ratio of two detected steady components of the sensor signal values. In this case the comparatively complex computational establishment of the temperature values based on the degree of emission is dispensed with.

Furthermore as an alternative just one heat radiation sensor can be provided for the detection of open fire and for establishing the ambient temperature, without any establishment and taking into account of the degree of emission being required. In this case the heat radiation sensor e.g. has an electrically-activatable optical filter connected upstream of it, so that two filter frequency ranges different from each other are able to be set. The electrical activation and the evaluation of the steady component of the sensor signal on the basis of a ratio pyrometry corresponding thereto may then be done by the processing unit. The optical filter can e.g. be designed such that it can be switched over to a filter frequency of 4 µm or 5.5 µm, with a bandwidth of 0.1 µm around these filter frequencies in each case.

This makes possible a spectral evaluation of the fluctuations and flicker frequencies in respect of the detection of open fire. Through this the reliability of the detection is increased.

According to a further embodiment the heat radiation sensor and the processing unit are combined in one component into a non-contact flame detector/temperature sensor. The expense of development, components and installation may be reduced by this.

In accordance with a further embodiment the heat emission sensor has a heat emission-sensitive sensor surface. An optical lens transparent for light in the mid-infrared range is disposed between the sensor surface and the housing part. This enables a greater acquisition area to be monitored by the heat emission sensor for the presence of open fire.

As an alternative or in addition an optical waveguide is disposed between the sensor surface and the housing part in the alarm cover. The optical waveguide is transparent for light in the mid-infrared range. In this case the heat radiation sensor can be disposed, for example, on an outer edge on the circuit carrier or in a non-critical area in the event of an optical measurement chamber for smoke particles being present. Conversely the housing part can continue to remain at the central position on the inner side of the alarm cover, wherein the axes of symmetry of the housing part and of the entire housing may align with one another. In this case too the heat radiation sensor and the housing part of the housing cover at the central position lie optically opposite one another. This is because the heat radiation coupled by the housing part into the optical waveguide runs via a number of total reflections in the optical waveguide for coupling out on the sensor surface of the heat radiation sensor. This may enable the inner space of the alarm housing to be kept free, such as to accept an optical measuring chamber for example. Optically disruptive components such as connection lines routed through the measurement chamber for example can be dispensed with. In addition the installation is significantly simplified.

According to one embodiment the heat radiation sensor has a thermopile or a bolometer. Compared to a sensor based on the pyroelectric effect which, because of physical conditions, is only capable of detecting dynamic changes of a hot object, thermopiles and also bolometers are capable of detecting static and also dynamic heat differences.

An example for a thermopile obtainable as an SMD component is e.g. the "Infrared Thermopile Sensor TMP006" from Texas Instruments, with housing dimensions of 1.6 mm×1.6 mm. This component also has a digital data interface for output of an already digital sensor signal for possible further processing by a microcontroller or microprocessor. In the associated "User's Guide", May 2011 Edition, mathematical equations are specified for computationally establishing a temperature value from a given degree of emission, from a sensor voltage corresponding to the sensor signal and from further parameters such as chip temperature and calibration factor. These equations can be then computationally resolved by means of suitable software routines on a downstream microcontroller.

According to a further embodiment the processing unit is configured to specify a first message in the event of detected significant fluctuations or flicker frequencies and also to output a second message if the established temperature value for the environment of the danger detector exceeds a predetermined temperature comparison value. This message can e.g. be an alarm message if a temperature value of e.g. 65° C. is exceeded. The message can be output over wires or wirelessly to a danger detection center or also optically and/or acoustically directly at the danger detector.

According to a further embodiment a gas sensor for fire flue gases and/or a measurement chamber with a scattered light arrangement for detection of smoke particles is accommodated in the danger detector. At least one entry opening for the fire flue gases or smoke particles to be detected is disposed in the housing. This means that further characteristic fire variables for a more reliable danger evaluation are available. These can be logically combined in a suitable way into an algorithm in the sense of a multi-criteria evaluation.

In the case of an optical smoke detector said detectors can have one or more scattered light arrangements disposed in the alarm housing for detection of smoke particles. The optical smoke detector in this case can be embodied as an open smoke detector, in which the detection space lies outside the alarm housing. It can also have a closed measurement chamber for smoke detection disposed in the alarm housing. Such an optical measurement chamber is also called a labyrinth, which on the one hand is shielded from outside light by optical panels, but on the other hand is permeable for smoke particles to be detected. For this purpose the alarm housing has at least one entry opening for the possible entry of smoke particles into the optical measurement chamber.

As an alternative or in addition a gas sensor for detection of fire flue gases such as CO or $NO_x$ can be accommodated in the danger detector. For this purpose the at least one entry opening for the fire flue gases to be detected is disposed in the housing. As an alternative or in addition the danger detector can have a detector unit operating in accordance with the optical extinction method and/or in accordance with the acousto-optical principle.

By taking into consideration different characteristic fire variables, such as e.g. the ambient temperature together with a gas concentration value typical of fire and/or with an optically-detected smoke particle concentration value, more precise analyses and plausibility checks by the processing unit are possible. The output of false alarms is reduced by means of such a multi-criteria evaluation.

The danger detectors considered can be connected via a common detector line, e.g., via a two-wire line for exchange of signals and data, to a danger detector center or to a fire alarm center. A number of such danger detectors can be connected in detector groups or detector lines to such a danger detection center, via which typically the danger detectors are also supplied with electrical power. As an alternative or in addition the danger detectors can be embodied "wirelessly". In this case said detectors preferably communicate via radio with the danger detector center or with further danger detectors.

Other embodiments provide a method for detection of open fire as well as for establishing a temperature value in the vicinity of a danger detector, wherein an incident heat radiation passing through a housing part permeable for heat radiation in the mid-infrared range, e.g., in a wavelength range of 3 µm to 20 µm, is detected in a non-contact manner by means of a heat radiation sensor sensitive therefor, e.g., using a thermopile or a bolometer, as a sensor signal. On the one hand the sensor signal is monitored for fluctuations or flicker frequencies characteristic for open fire and on detection a first message is output. On the other hand a temperature value for an ambient temperature in the environment of the danger detector is established in pyrometric ways from a steady component of the sensor signal. Finally the temperature value and/or a second message are output if the established temperature value exceeds a predetermined temperature comparison value.

In accordance with a variant of the method the temperature value is established computationally for this heat radiation in the mid-infrared range, taking into account a degree of emission depending on the material and/or on the surface properties of the housing part.

As an alternative to this the temperature value can also be established on the basis of a ratio pyrometry. By contrast with so-called single-color pyrometry, as previously described, by means of ratio pyrometry, which is also called two-color pyrometry, no establishment and taking into account of the degree of emission is necessary.

FIG. 1 shows an example of a danger detector 1 embodied as a flame detector in accordance with the invention. An alarm housing, which includes components such as an alarm cover labeled 21, is labeled with the reference character 2. The alarm cover 21 can also be called the detector lid, covering or cap. An axis of symmetry of the alarm housing 2 typically embodied rotation-symmetrical is also indicated, which thus represents a central area Z for the danger detector 1.

Furthermore a housing part 22 of the alarm cover 21 is shown which is permeable for heat radiation W in the mid-infrared range. The housing part 22 is preferably embodied rotation-symmetrical, such as e.g. also in the present example in the form of a circular disk. The remaining part labeled 21' of the alarm cover 21 adjoining the housing part 22 on the other hand is light-tight, i.e. no light either in the visible or in the infrared range actually penetrates through this remaining part 21' into the housing interior IR. In the alarm cover 21, as shown by dashed lines, entry openings OF can also be present in order e.g. to make possible the entry of flue gases into the housing interior IR as well as their detection by means of a gas sensor present there not shown in any greater detail. A detector base is labeled with the reference character 20, for releasably accepting the danger detector 1, preferably on a ceiling. Accommodated in the danger detector 1 is a circuit carrier 3, such as e.g. a printed circuit board. A number of components such as resistors, capacitors and semiconductor components are typically disposed on this circuit carrier 3. For reasons of clarity a more detailed drawing has been dispensed with.

However a non-contact heat radiation sensor 4a, sensitive to heat radiation W in the infrared range labeled with the reference character 4a as well as a downstream processing unit 4b for further processing in accordance with the invention of a sensor signal output by the heat radiation sensor 4a are shown. The optical detection area of the heat radiation area 4a is labeled FOV. The processing unit 4b is at least intended or configured for establishing a temperature value TEMP for the ambient temperature T in the environment of the danger detector 1 derived from a steady component of the sensor signal. The processing unit 4b is also configured to monitor the sensor signal for the occurrence of significant fluctuations or flicker frequencies for open fire. The processing unit 4b, in accordance with the invention, can be configured as an alternative or in addition as indicated by an arrow in the present example, to output a first message FLAME in the event of detected significant fluctuations or flicker frequencies and also a second message ALARM if the established temperature value TEMP for the environment of the danger detector exceeds a predetermined temperature comparison value.

Furthermore, in accordance with the invention, the heat radiation sensor 4a has a thermopile designed as an SMD component. It is preferably sensitive to infrared light in the wavelength range from 2 µm to 50 µm, e.g., from 3 µm to 20 µm.

In accordance with the invention the processing unit 4b is also configured for computational establishment and derivation of the temperature value TEMP from the steady component of the sensor signal and from a stored value from the degree of emission of the housing part 22. The degree of emission in this case is dependent on the surface property as well as the material of the housing part 22 shown.

Figure 2:
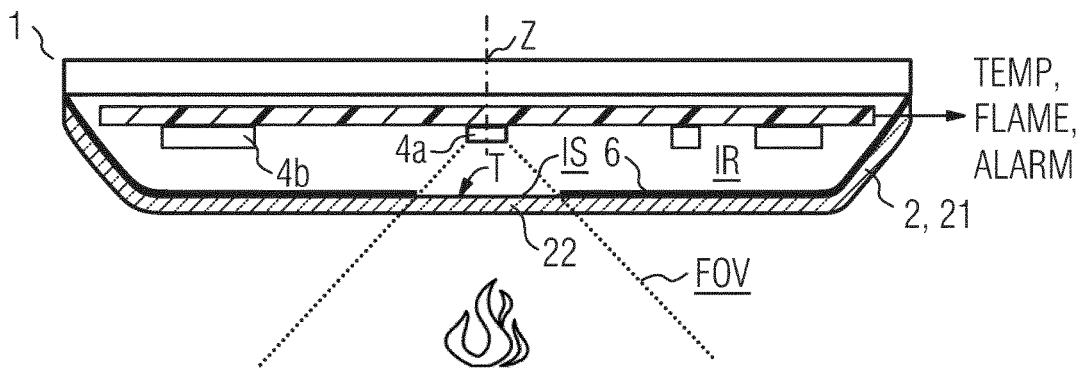
FIG. 2 shows an example of a danger detector in accordance with a first form of embodiment.

FIG. 2 shows an example of a danger detector 1 according to a first form of embodiment. In this case the entire alarm cover 21 comprises a material permeable for infrared light. In particular this material is opaque for visible light. The housing thus appears white, matt white or white-opaque to an observer. Naturally material can also be another color such as e.g. red, matt-red or red-opaque. In order to avoid disruptive influences from natural infrared scattered light on the heat radiation sensor 4a, an aperture diaphragm light-tight for infrared light, such as in the form of an adhesive foil for example, is attached to the inner side of the alarm cover 21. In this case the housing part 22 corresponds to the part of the alarm cover 21 not covered by the aperture diaphragm 6. As an alternative the heat radiation sensor 4a can also be surrounded by a hollow cylinder made of a material light-tight for infrared and visible light, wherein the hollow cylinder extends from the circuit carrier 3 to the inner side of the housing part 22 or to the alarm cover 21.

Figure 3:
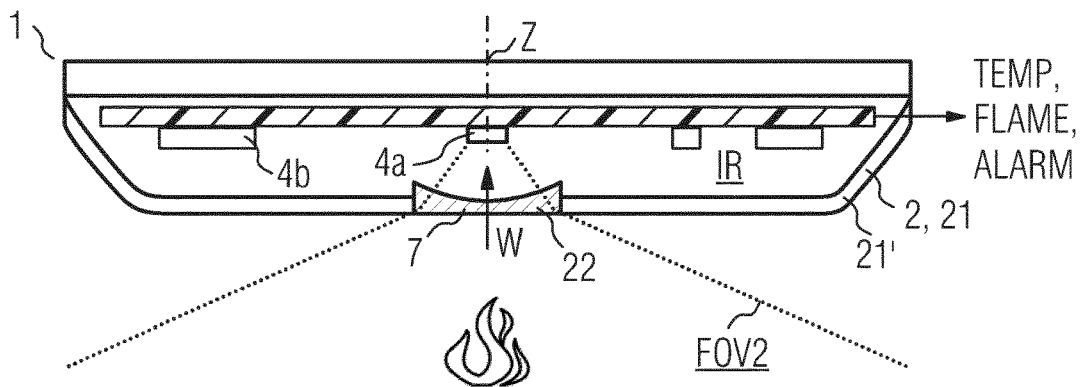
FIG. 3 shows an example of a danger detector in accordance with a second form of embodiment.

FIG. 3 shows an example of a danger detector 1 according to a second form of embodiment. In this case the housing part 22 is the same time an optical lens 7. It is intended to widen out the detection area FOV2 optically compared to the detection area FOV according to FIG. 1 and FIG. 2. The optical lens 7 is transparent in this case for light in the mid-infrared range. The lens 7 can be inserted as a separate component into a corresponding opening in the alarm cover 21. As an alternative the entire alarm cover 21 can be formed from a material permeable to infrared light in the wavelength range from 2 µm to 50 µm, e.g., from 3 µm to 20 µm, wherein then the lens 7 shown in FIG. 3 is also molded out integrally in the alarm cover 21. For shielding, as previously described, an adhesive film as an aperture diaphragm 6 or a hollow cylinder can be used.

Figure 4:
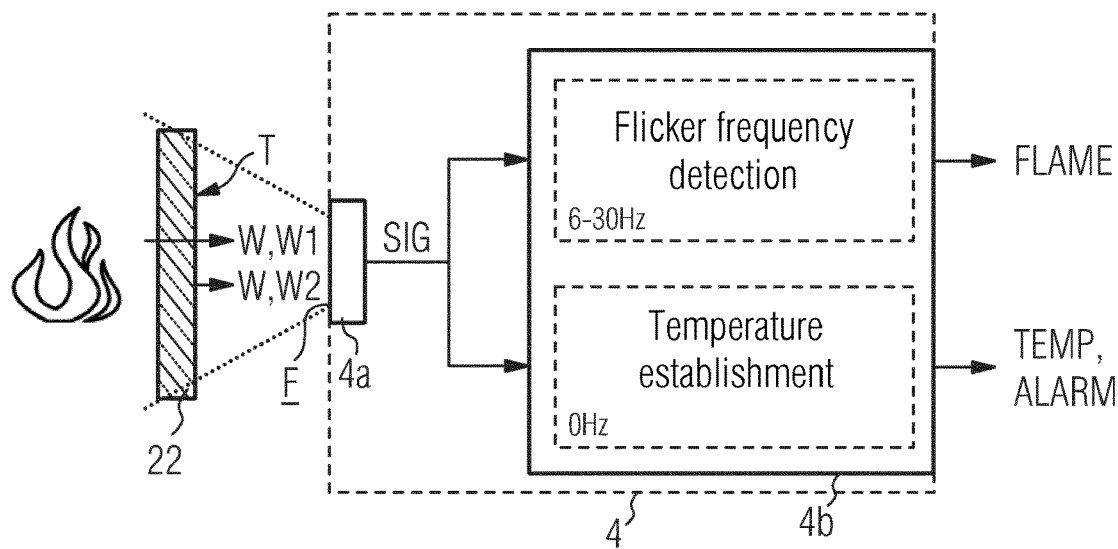
FIG. 4 shows a measurement principle for detection of open fire and for establishing a temperature value in the environment of a danger detector embodied as a point-type detector in accordance with certain embodiments.

FIG. 4 shows a measurement principle for detection of open fire and for establishing a temperature value TEMP in the environment of a danger detector 1 embodied as a point-type detector.

In accordance with the inventive method a first heat radiation W1 passing through the housing part 22 as well as a second heat radiation W2 emitted by the housing part 22 itself is detected by the heat radiation sensor 4a as a sensor signal SIG. The sum of the first and second heat radiation W1, W2 is then ultimately the incident heat radiation W, to which the non-contact heat radiation sensor 4a optically aligned on the housing part 22 is sensitive.

In accordance with the invention on the one hand the sensor signal SIG is monitored for fluctuations and flicker frequencies characteristic of open fire and on detection thereof a first message FLAME is output. This can be done for example by a frequency filtering in a frequency range from 6 to 30 Hz, which is typical of flicker frequencies and emissions for open fire. In parallel to this a temperature value TEMP for an ambient temperature T in the environment of the danger detector 1 is established in pyrometric ways from a steady component of the sensor signal SIG. The temperature value TEMP and/or a second message ALARM are output if the established temperature value TEMP exceeds a predetermined temperature comparison value. The establishment and output is realized by a processing unit 4b, which together with the heat radiation sensor 4a, can also be combined into a common component 4. The designation "0 Hz" is intended to symbolize that the steady component in the sensor signal SIG is evaluated here. The steady component can be derived for example by a lowpass filtering of the sensor signal SIG with an edge frequency of e.g. 1 Hz. This also enables noise signals to be filtered out of the sensor signal SIG.

Figure 5:
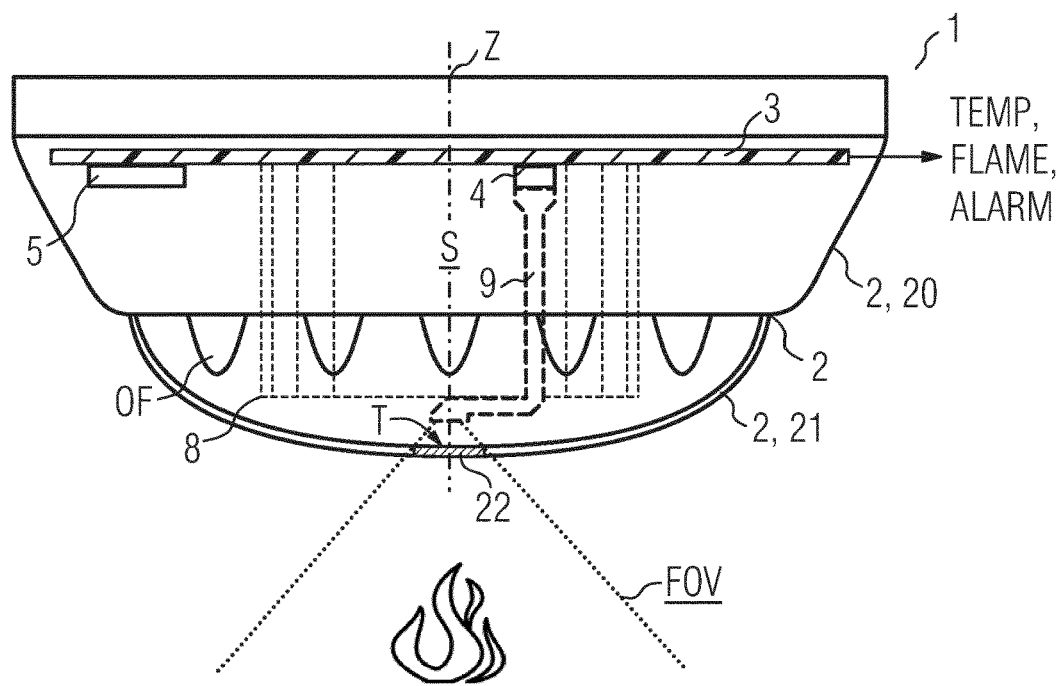
FIG. 5 shows an example for a danger detector embodied as an optical smoke detector with an internal optical measuring chamber and with an optical waveguide in accordance with certain embodiments.

FIG. 5 finally shows an example for a danger detector 1 embodied as an optical smoke detector with a measurement chamber 8 lying therein and with an optical waveguide 9 in accordance with the invention. In the present example the heat radiation sensor and the processing unit are combined into one component in the sense of a combined flame detector/temperature sensor 4. The reference character 5 designates a higher-ranking central processing unit.

In accordance with the invention an optical waveguide 9 is disposed between the sensor surface F of the temperature sensor 4 or between the sensor surface F of the heat radiation sensor 4a as a part of the temperature sensor 4, and the housing part 22 in the housing interior IR. The latter is transparent for light in the mid-infrared range. The enables the internal area highly sensitive to scattered light, e.g., the scattered light center S, to be kept free of disruptive line pass-throughs. The optical waveguide 9 can be snapped for example onto the measurement chamber housing, or in the case of a plastic injection-molded part, can be injection-molded onto the chamber housing.

LIST OF REFERENCE CHARACTERS

1 Danger detector, flame detector
2 Alarm housing

3 Circuit carrier, circuit board
4 Temperature sensor
4a heat radiation sensor, thermopile, bolometer
4b Processing unit, microcontroller
5 Further processing unit, main controller
6 Aperture diaphragm, screening film, coating
7 Optical lens
8 Optical measurement chamber, labyrinth
9 Optical waveguide
20 Detector base
21 Alarm cover, lid, covering, cap
21' Remaining part
22 Housing part
ALARM Message, alarm message
F Sensor surface
FOV, FOV2 Acquisition area
IR Inner space, housing interior
IS Inner side
OF Entry opening
S Scattered light center
SIG Sensor signal
T Ambient temperature
TEMP Temperature value
FLAME Message, alarm message
W Heat radiation
W1 Heat radiation from outside or from open fire
W2 Heat radiation from housing part
Z Central position, main symmetry axis

What is claimed is:

1. A danger detector comprising:
an alarm housing with an alarm cover,
a first part of the alarm cover transparent to heat radiation in the mid-infrared range,
a second part of the alarm cover impermeable to heat radiation in the mid-infrared range,
a non-contact heat radiation sensor disposed in an interior of the alarm housing and optically aligned to the first part of the alarm cover, wherein the non-contact heat radiation sensor is configured to output a sensor signal sensitive to incident heat radiation,
a processing unit, and
computer-readable instructions stored in non-transitory computer-readable media and executable by the processing unit to:
monitor the sensor signal output by the non-contact heat radiation sensor, including filtering the sensor signal in a frequency range from 6 to 30 Hz,
upon discovering fluctuations or flicker frequencies in the sensor signal within the frequency range, transmit a first message including an indication of open flame,
filter the sensor signal with an edge frequency of 1 Hz to isolate a steady baseline component of the sensor signal,
determine, based on the steady baseline component of the sensor signal, an ambient temperature value corresponding to the steady baseline component and identify the ambient temperature value as an ambient temperature in an environment of the danger detector,
compare the determined ambient temperature value with predetermined temperature comparison value, and
transmit a second message in response to determining that the determined ambient temperature value exceeds the predetermined temperature comparison value.

2. The danger detector of claim 1, wherein the first part comprises a material that is permeable for light in the mid-infrared range.

3. The danger detector of claim 2, wherein the first part comprises a material with an emissivity of at least 0.75 for infrared heat radiation.

4. The danger detector of claim 2, wherein the first part comprises particles having a volume proportion and a size distribution sufficient to scatter visible light and let a majority of infrared light pass.

5. The danger detector of claim 2, wherein the first part of the housing comprises heat radiation particles with a degree of emission of at least 0.9 for the heat radiation in the infrared range.

6. The danger detector of claim 1, wherein the first part of the alarm cover is located at a central position of the housing to thereby provide direction-independent acquisition of the ambient temperature.

7. The danger detector of claim 1, wherein determining the temperature value is further based on a stored value for an emissivity of the first part of the alarm cover.

8. The danger detector of claim 1, wherein:
the heat radiation sensor has a heat radiation-sensitive sensor surface, and
an optical device comprising a part of the alarm cover optically widening an area field of view of the sensor surface.

9. The danger detector of claim 1, wherein the heat radiation sensor comprises a thermopile or a bolometer.

10. The danger detector of claim 1, further comprising:
a gas sensor configured to detect fire flue gases, or
a measurement chamber with an arrangement configured to detect smoke particles, and
an entry opening for the fire flue gases or smoke particles disposed in the housing.

11. The danger detector of claim 1, wherein the first part of the housing comprises a material that is permeable for light in a range from 3 μm to 20 μm.

12. A method for fire detection and for establishing a temperature value in the environment of a danger detector, the method comprising:
generating a sensor signal corresponding to a heat radiation entering a housing through a first part of the housing transparent to heat radiation in the mid-infrared range, wherein a second part of the alarm cover is impermeable to heat radiation in the mid-infrared range,
filtering the sensor signal in a frequency range from 6 to 30 Hz,
analyzing the filtered sensor signal to detect fluctuations or flicker frequencies within the frequency range,
automatically transmitting a first message in response to detecting the fluctuations or flicker frequencies characteristic of the presence of the open fire in response to the sensor signal characteristic of open fire, wherein the first message includes an indication of an open flame,
filtering the sensor signal with an edge frequency of 1 Hz to isolate a steady baseline component of the sensor signal,
determining, based on the steady baseline component of the sensor signal, an ambient temperature value corresponding to the steady baseline component,
identifying the ambient temperature value as an ambient temperature in an environment of the danger detector,
comparing the determined ambient temperature value to a predetermined temperature comparison value, determining that the determined ambient temperature value exceeds the predetermined temperature comparison value, and automatically transmitting the determined temperature value to a danger detector center or a fire alarm center in response to determining that the determined ambient temperature value exceeds the predetermined temperature comparison value.

13. The method of claim 12, wherein the temperature value is determined based at least on a physical property related to heat radiation of at least one of a material or a surface property of the first part of the housing.

14. The method of claim 12, wherein the temperature value is determined based on a ratio pyrometry.

15. The method of claim 12, wherein the sensor signal is generated by a thermopile or a bolometer.

16. The method of claim 12, wherein the first part of the housing is transparent to heat radiation in a range from 3 µm to 20 µm.

17. A danger detector comprising:
an alarm housing with an alarm cover,
a first part of the alarm cover transparent to heat radiation in the mid-infrared range,
a non-contact heat radiation sensor disposed in the alarm housing and optically aligned to the first part of the alarm cover, wherein the heat radiation sensor has a heat radiation-sensitive sensor surface and the heat radiation sensor is configured to output a sensor signal based as a function of incident heat radiation,
an optical device mounted in the alarm cover and optically widening an area field of view of the sensor surface,
a processing unit, and
computer-readable instructions stored in non-transitory computer-readable media and executable by the processing unit to:
monitor the sensor signal output by the non-contact heat radiation sensor,
filter the sensor signal in a frequency range from 6 to 30 Hz,
analyze the filtered sensor signal for fluctuations or flicker frequencies within the frequency range,
transmit a first message in response to detecting the fluctuations or flicker frequencies, wherein the first message includes an indication of an open flame,
filter the sensor signal with an edge frequency of 1 Hz to isolate a steady baseline component of the sensor signal,
determine, based on the steady baseline component of the sensor signal, an ambient temperature value corresponding to the steady baseline component and identify the ambient temperature value as an ambient temperature in an environment of the danger detector,
compare the determined ambient temperature value with predetermined temperature comparison value, and
transmit a second message in response to determining that the determined ambient temperature value exceeds the predetermined temperature comparison value.

* * * * *